(12) United States Patent
Curien

(10) Patent No.: US 8,407,850 B2
(45) Date of Patent: Apr. 2, 2013

(54) VACUUM SUCTION AND CLEANING APPARATUS

(75) Inventor: Gerard Curien, Housseras (FR)

(73) Assignee: Winddrop, Fremifontaine (FR)

( * ) Notice: Subject to any disclaimer, the term of this patent is extended or adjusted under 35 U.S.C. 154(b) by 894 days.

(21) Appl. No.: 12/517,147

(22) PCT Filed: Nov. 29, 2007

(86) PCT No.: PCT/FR2007/052423
§ 371 (c)(1),
(2), (4) Date: Jul. 6, 2009

(87) PCT Pub. No.: WO2008/065313
PCT Pub. Date: Jun. 5, 2008

(65) Prior Publication Data
US 2010/0050368 A1    Mar. 4, 2010

(30) Foreign Application Priority Data

Dec. 1, 2006  (FR) ...................... 06 10563
Apr. 3, 2007  (WO) ................. PCT/FR2007/051060
May 31, 2007 (WO) ................. PCT/FR2007/051364

(51) Int. Cl.
*A47L 5/24*    (2006.01)
(52) U.S. Cl. ........................................ 15/344
(58) Field of Classification Search .............. 15/29, 320, 15/344, 374
See application file for complete search history.

(56) References Cited

U.S. PATENT DOCUMENTS 2,229,083 A   1/1941  Hansen
4,251,241 A   2/1981  Bothun
4,382,804 A   5/1983  Mellor
5,129,121 A * 7/1992  Gelman ......................... 15/29
5,911,896 A   6/1999  Holden et al.
6,090,174 A   7/2000  Douma et al.
6,502,275 B1  1/2003  Hsieh
2003/0233728 A1  12/2003  Wheeler et al.
2004/0028396 A1   2/2004  Russegger

FOREIGN PATENT DOCUMENTS

DE    1144999         3/1963
DE    3001017 A1      7/1981

(Continued)

OTHER PUBLICATIONS

Translation of the International Preliminary Report on Patentability (Form PCT/IB/373) of priority International Application No. PCT/FR2007/051364 dated Jan. 13, 2009 with forms PCT/ISA/237.

(Continued)

*Primary Examiner* — Robert Scruggs
(74) *Attorney, Agent, or Firm* — Westerman, Hattori, Daniels & Adrian LLP

(57) ABSTRACT

The invention relates to a vacuum suction and cleaning apparatus comprising a nozzle (38), ventilation means (40), a clean water tank (20), an air-water separator (50), a recovery tank (4) for soiled liquid and/or dirt, a handle (5) for manipulation with one hand, a heating means (19) using a ceramic for electrical and thermal insulation.

It is wherein the separator (50) comprises a brush (2) driven in rotation, that prolongs the ventilation means (40), rotating with a turbine (11) or nozzle (51) serving as support, and that the apparatus (100) comprises an air evacuation hose (6) incorporated in the handle (5) prolonging a by-pass, and that the recovery tank (4) is located under the separator (50).

16 Claims, 6 Drawing Sheets

FOREIGN PATENT DOCUMENTS

| | | |
|---|---|---|
| DE | 10059885 C1 | 7/2002 |
| EP | 0768058 A2 | 4/1997 |
| EP | 0897740 A2 | 2/1999 |
| EP | 1655408 A1 | 5/2006 |
| GB | 754262 A | 8/1956 |
| GB | 2382042 A1 | 5/2003 |
| WO | 94/24920 A1 | 11/1994 |

OTHER PUBLICATIONS

International Search Report (PCT/ISA/210) of priority International Application No. PCT/FR2007/051364, date of mailing Nov. 7, 2007.

Translation of the International Preliminary Report on Patentability (Form PCT/IB/373) of priority International Application No. PCT/FR2007/051060 dated Dec. 3, 2008 with Forms PCT/ISA/237.

International Search Report (PCT/ISA/210) of priority International Application No. PCT/FR2007/051060, date of mailing Sep. 19, 2007.

International Search Report (PCT/ISA/210) of International Application No. PCT/FR2007/052423 dated Jan. 12, 2006 with forms PCT/ISA/237.

International Search Report of priority French Application No. 0610563, dated Aug. 1, 2007.

\* cited by examiner

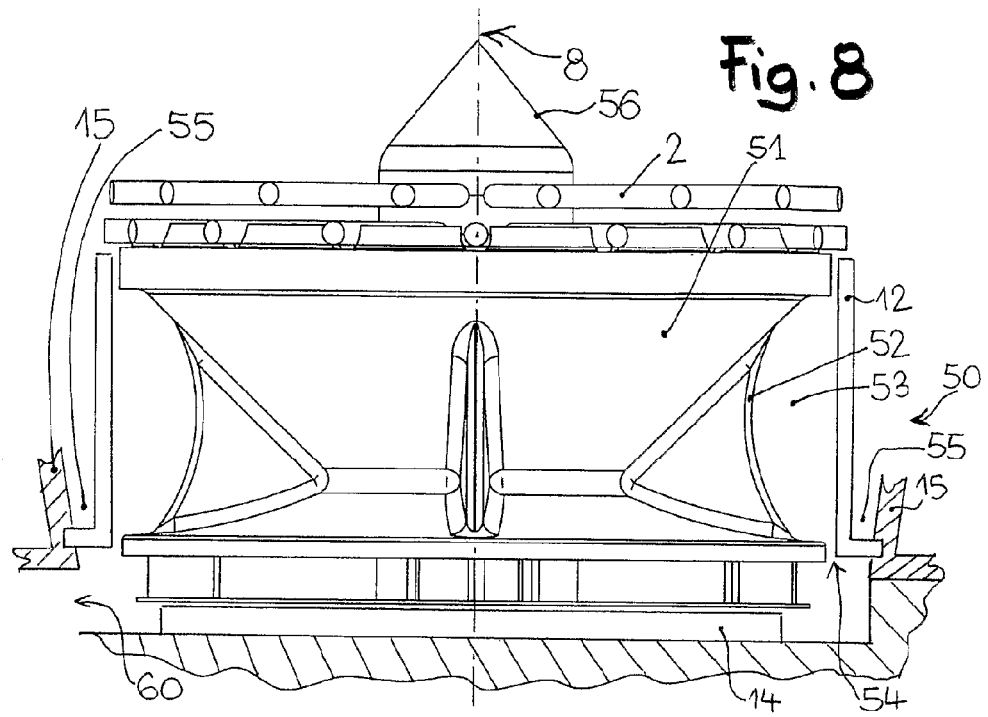
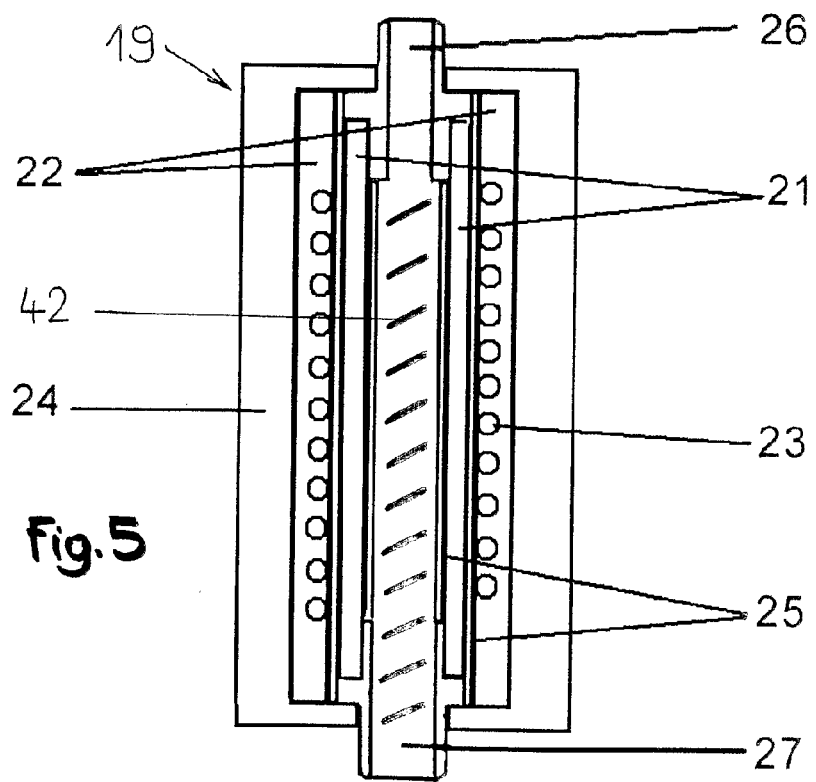

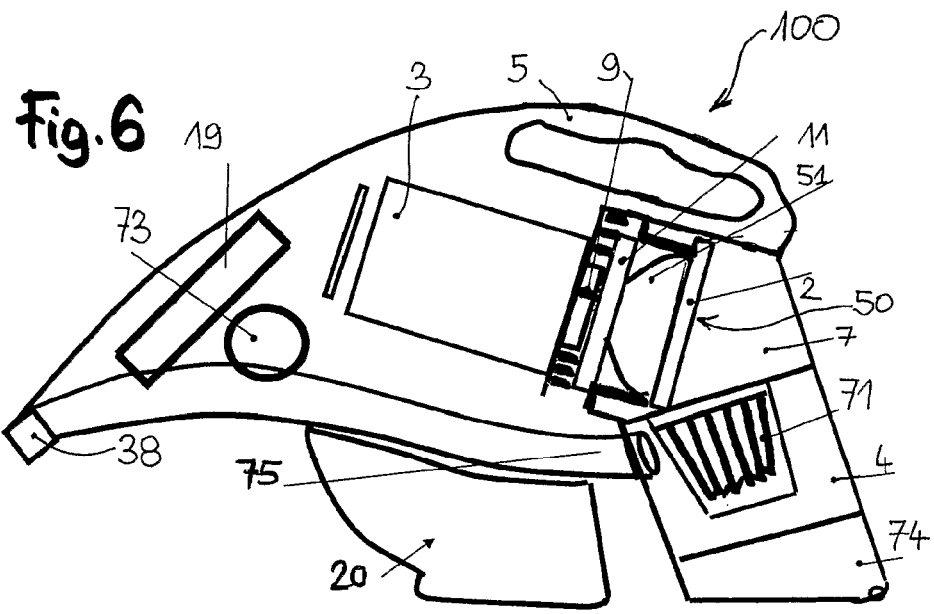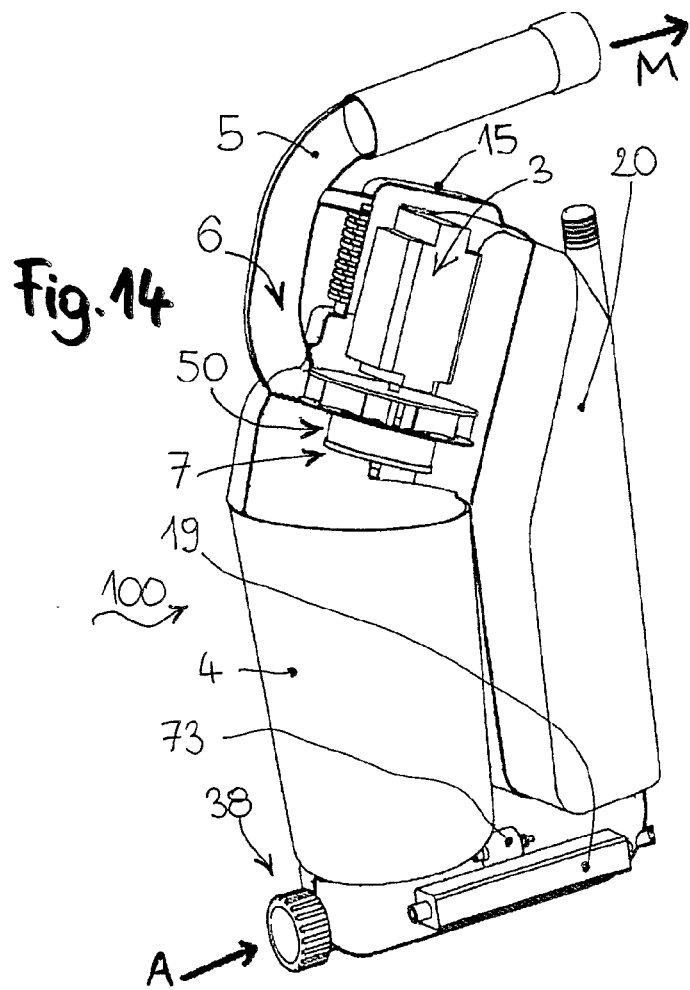

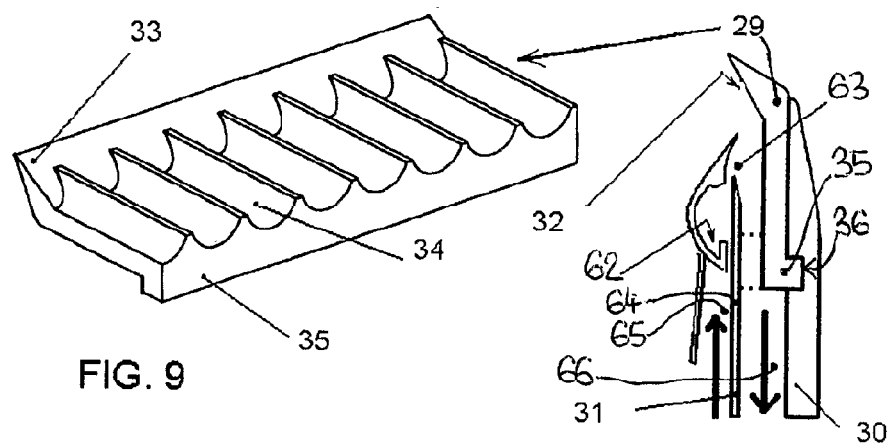
FIG. 9
FIG. 10
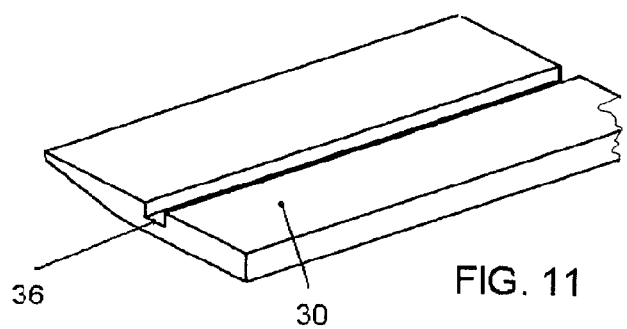
FIG. 11
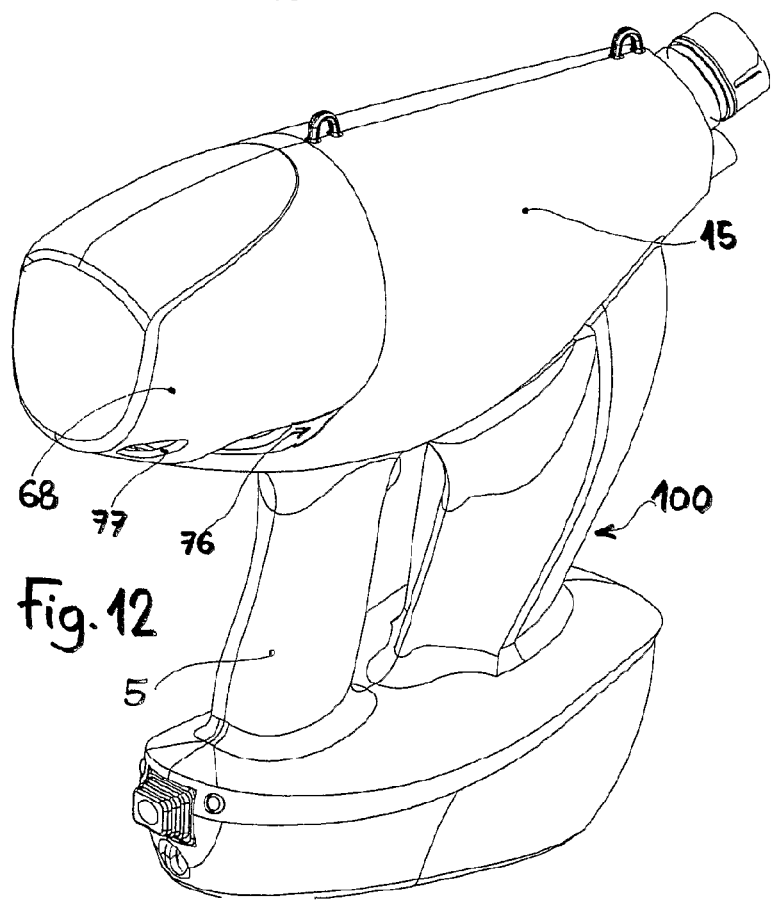
Fig. 12

VACUUM SUCTION AND CLEANING APPARATUS

BACKGROUND OF THE INVENTION (1) Field of the Invention

The invention relates to an vacuum suction and cleaning appliance for water and/or dust comprising, integrated into one shell:
- a nozzle,
- ventilation means,
- a clean-water tank,
- an air-water separator,
- a recovery tank for soiled liquid and/or dust located under said separator,
- a handle allowing handling the appliance and the nozzle with one hand,
- heating means using a ceramic for electrical and thermal insulation.

The invention relates to the field of the movable cleaning appliances, and in particular of the household electrical appliances.

(2) Description of the Prior Art

In the field of the large appliances, there exist vacuum-cleaners or vapor vacuum-cleaners usable to suck up water and dust. In the field of the manual or portable appliances, and as soon as the air flow is correct, the existing appliances are seldom designed to suck up liquids. Or they have low performances because they do not have a liquid/gas separator, which is necessary as soon as the air flow is constant, since the only effect of gravity in small volumes does not allow achieving a sustained vacuum. Moreover, these appliances are often poorly suited, generally provided with traditional woven or foam filters, or with water traps included in the tank through which passes the air. These systems will never allow a sustained air flow and only partially retain water. Moreover they require cleaning, even a regular replacement. The appliances having a built-in and small-size heating body, i.e. with a mass of 2 kg or less, have a low power, generally lower than 1300 Watts, and a vacuum capacity lower than 10 kPa.

Various attempts have been made to manufacture household utensils including a function of separation between air, on the one hand, and a liquid or liquid and solid phase with suspended dust, on the other hand. These attempts generally fail because of insufficient efficiency of the means implemented for purifying the air.

WO 94/24920 is thus known, which describes a vapor vacuum-cleaner, in which the separation of the phases is carried out only by the combination of a liquid separator and a simple deviation partition directing the liquid towards a receptacle, the air being directed towards a filtering chamber, which must then be provided with a filter. The use of this filter shows the imperfect effectiveness of such a device.

U.K. 2 382 042 describes a centrifugal filter with a brush, of a known type, in which an air flow loaded with liquid and dust passes, at least partly, through a rotary brush, which ejects at the periphery a large part of the liquid and dust. Here too, the effectiveness is limited, because of significant pressure drops, and the need for juxtaposing, in series, several devices of the same type, to manage to make the air sufficiently clean for its rejection into the environment. Therefore, the size is necessarily large and proves incompatible with the use for a household appliance, a fortiori for a light appliance intended to be handled with one hand. These systems do not guarantee that dry or wet particles will be retained. In addition, the tightness is not complete at the level of the brushes, since the air loaded with impurities can bypass the brush and circulate towards the evacuation conduit.

There are known vacuum-cleaners for water and dust, for example shampooing cleaners, ejectors-extractors, or vapor vacuum-cleaners, which are bulky and exist almost exclusively in canister, sledge, sometimes brush version, because of the poorly suited or non-existing water/air separation systems.

A difficult case of cleaning is the cleaning of glass surfaces that have previously been humidified with water or vapor. This cleaning, in the event of suction by ventilation, requires the vacuum suction appliance to include a liquid-separating filter placed on the air circuit before the latter is expelled from the appliance.

The design of lightweight portable household appliances implies a number of choices as regards the dimensioning of the devices installed to meet the basic functions, and the judicious combination of which must enable achieving a sufficient efficiency of the appliance that makes it usable.

Though the problem of the quality of the gas phase separation requires, as we have seen above, a large volume and weight in the solutions known from the state of the art, one is generally also confronted with the problem of generation of a sufficient quantity of vapor, with a perfectly satisfactory safety for the user.

The generation of vapor generally occurs by using electrical resistances. The presence of electric circuits, and switching means necessary for their control by the user, in a medium that is wet by nature, generally requires the installations to be grounded. This grounding classically results into the use of a power cord with three wires, one of which is for grounding. Compared to a two-wire power cord, which, in absolute terms, would be sufficient for supplying energy to the heating resistance, passing to three wires results into an increase of the cost, weight, but also of the volume generated by the power-supply function. This constraint namely impedes any design with a cord take-up drum, for a sledge-type appliance or small manual household appliances, which is against the expectations of the market.

The solutions in which the network supply would be omitted, in particular by using batteries or/and cells, are currently not viable, because of the high weight of the energy-storage means necessary for a sustained production of vapor, incompatible with a manual use, and also because of the high cost of this equipment.

The cleaning of windows or other supports is a household problem for which there has not been developed any economical solution that enables to carry out in one passage the application of vapor or a hot or cold liquid product and simultaneously a strong suction, with a vacuum close to or higher than 15 kPa, with a light, compact, portable or manual appliance. A difficult problem is that of its gripping with one hand by the user, who must often work at a high level, and can have to hold the apparatus at the end of his arm, depending on the equipment at his disposal to work at a high level.

The aim of the invention is to cope with these main difficulties by providing a compact, light, powerful, economical and ecological, preferably portable household cleaning appliance, water and/or dust recovery appliance, having a self-cleaning separation system, usable in all positions, and especially with high efficiency characteristics as regards generation of heating energy and purification of the air released into the environment, which are higher than those that are difficultly achieved by larger-size appliances, often compelled to roll because of their volume and their mass.

SUMMARY OF THE INVENTION

To this end, the invention relates to a vacuum suction and cleaning appliance for water and/or dust including, integrated into a shell:
- a nozzle,
- ventilation means,
- a clean-water tank,
- an air-water separator,
- a recovery tank for soiled liquid and/or dust,
- a handle designed capable of allowing handling the appliance and nozzle with one hand,
- heating means using a ceramic for electrical and thermal insulation, wherein said air-water separating means includes at least one brush driven in rotation, in the extension of said ventilation means, said brush rotating with at least one turbine or nozzle serving as a support, and the appliance comprises a hose for evacuating the liquid-free air, incorporated in said handle prolonging a by-pass, and said recovery tank for soiled liquid and/or dust is located under said separator.

According to a feature of the invention, the tubular heating means includes, from the inside towards the outside:
- a central tube in which circulates water to be vaporized,
- a heat-conducting electrical insulator,
- a heating resistance placed at the periphery of the heating means,
- a non-fibrous ceramic external thermal insulator, which is advantageously also an electric insulator, protecting the complete heating means.

According to another feature of the invention, the heat-conducting electric insulator is in the form of a solid material consisting of a ceramic, or a thin layer deposited on the surface of the central tube in the form of a layer of aluminum oxide or of a thin layer of ceramic obtained by quenching and baking lining the electric insulation from water and limiting the adhesion of limestone.

According to another feature of the invention, said vacuum suction and cleaning appliance is portable and is designed capable of being handled with one hand by the user.

The invention also relates to a window cleaner including such features.

The invention also relates to heating means in the form of a boiler for a cleaning appliance.

The portable vacuum suction appliance according to the invention is light, handy and usable in all positions, powerful, multi-purpose, economical, of instantaneous use.

In a preferred embodiment, this appliance provides instantaneous vapor generation at a permanent flow rate, which permits to clean windows, fabrics and wall-to-wall carpets, carpets, or hard floors, in the same way as shampooing cleaners.

It is advantageously provided with a scraper, specifically elaborated for the suction to be optimal and the drops not to flow off the scraper during the window-cleaning operation. This allows having one and the same appliance, traditional vacuum-cleaner, vapor cleaner and window-cleaner, and avoids the acquisition of an expensive, heavy, cumbersome appliance for this application.

The gripping handle, the light weight and the limited size of the appliance, with in particular the possibility of manual gripping or portable with a shoulder-belt, allow anybody to use it in varied situations and in particular for cleaning windows, or in reduced spaces such as inside a car with the specific use of suitable accessories.

The external shell integrates the by-pass, which is a deviation for preventing sucked-up air from passing into the motor, and the evacuation hose. It is advantageously injection-molded in two parts, which can be directly encased into each other without further mounting nor any uniting whatsoever.

Further features and advantages of the invention will become clear from the following description, when referring to the attached drawings, which are given only by way of non-restrictive examples.

BRIEF DESCRIPTION OF THE DRAWINGS

FIG. 5 shows a schematic and cross-sectional view of heating means suited for the production of vapor;

FIG. 6 shows a schematic and cross-sectional view of a vacuum suction and cleaning appliance for water and/or dust according to a second variant of the invention;

FIG. 8 shows a schematic and exploded view of the air-water separating appliance with a brush in a second embodiment, also shown in FIG. 7;

FIGS. 9 and 11 are schematic, partial and perspective views of a scraping organ for a window-cleaner of a vacuum suction and cleaning appliance for water and/or dust according to the invention, and its specific shape;

FIG. 10 is a schematic and cross-sectional view of such a scraping organ;

FIG. 12 shows a schematic and perspective view of the third variant of the vacuum suction and cleaning appliance for water and/or dust of FIG. 7;

FIG. 14 shows a schematic and perspective view of a fourth variant of the vacuum suction and cleaning appliance for water and/or dust.

Figure 1:
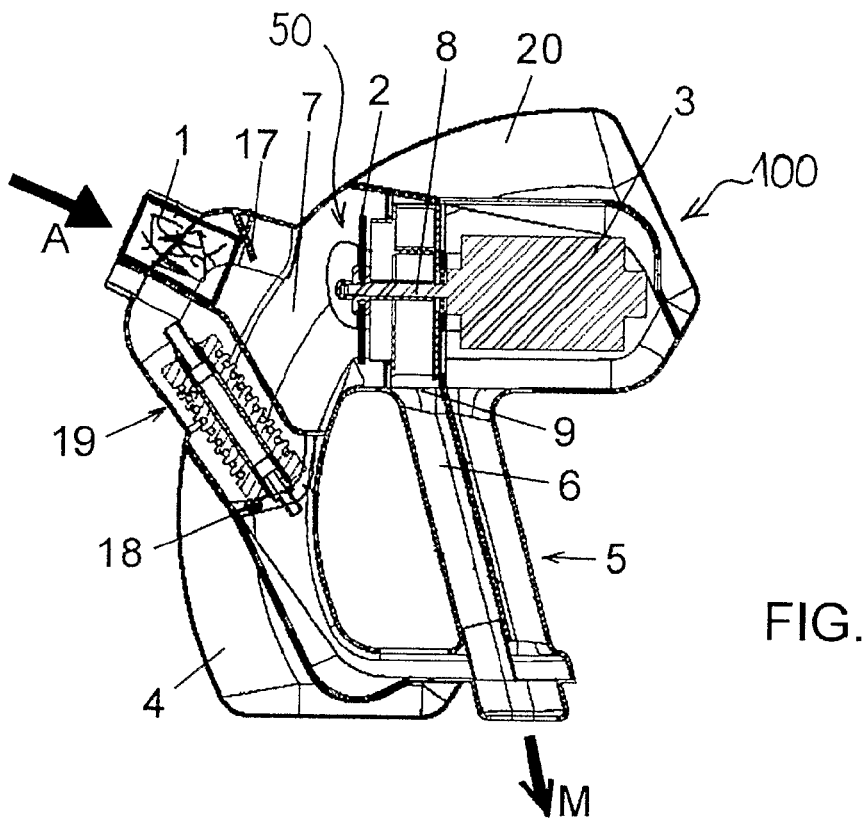
FIG. 1 schematically shows a cross-sectional view of a vacuum suction and cleaning appliance for water and/or dust according to a first variant of the invention.

The arrow A represents the suction side plus the vapor outlet conduit onto which the accessories are adapted by all known means and in particular sliding ring systems.

The arrow M designates the purified-air outlet, onto which other accessories, such as a hose for a blower, a perfume diffuser, or a complementary silencer, or the like, can be adapted.

DETAILED DESCRIPTION OF THE PREFERRED EMBODIMENTS

The invention relates to the field of the movable cleaning appliances, and in particular of the electrical household appliances.

The vacuum suction and cleaning appliance 100 according to the invention is preferably portable, and includes, integrated in a shell 15:
- a nozzle 38, designed capable of receiving a first dust filter 72,
- ventilation means 40, a tank for cleaning liquid, in particular clean water, 20,
an air-water separator 50,
a handle 5 designed capable of allowing handling the appliance and nozzle with one hand,
a recovery tank for soiled liquid and/or dust 4, preferably located under the separator 50, with, depending on the versions, a filtering by water of dust in the latter. By "under" is meant a reference to a position referred to as normal working position in which the operator holds the appliance 100 with his fist closed around the substantially vertical handle 5 and with the nozzle 38 in high position with respect to the rest of the appliance.
heating means 19, preferably using a ceramic for electrical and thermal insulation.

The separation between the sucked up air, on the one hand, and the liquid carrying dust, on the other hand, occurs by separating means, which can adopt the form of water-air separating means 50, in the extension of the ventilation means 40, or also by means of a devesiculating filter 1 at the inlet of the appliance, with a device for guiding waste water, or both at the same time.

The ventilation means 40 is comprised of motorization means 3, preferably an electric motor, with at least a propeller or a turbine 11 ensuring the sucking up of the air.

Figure 7:
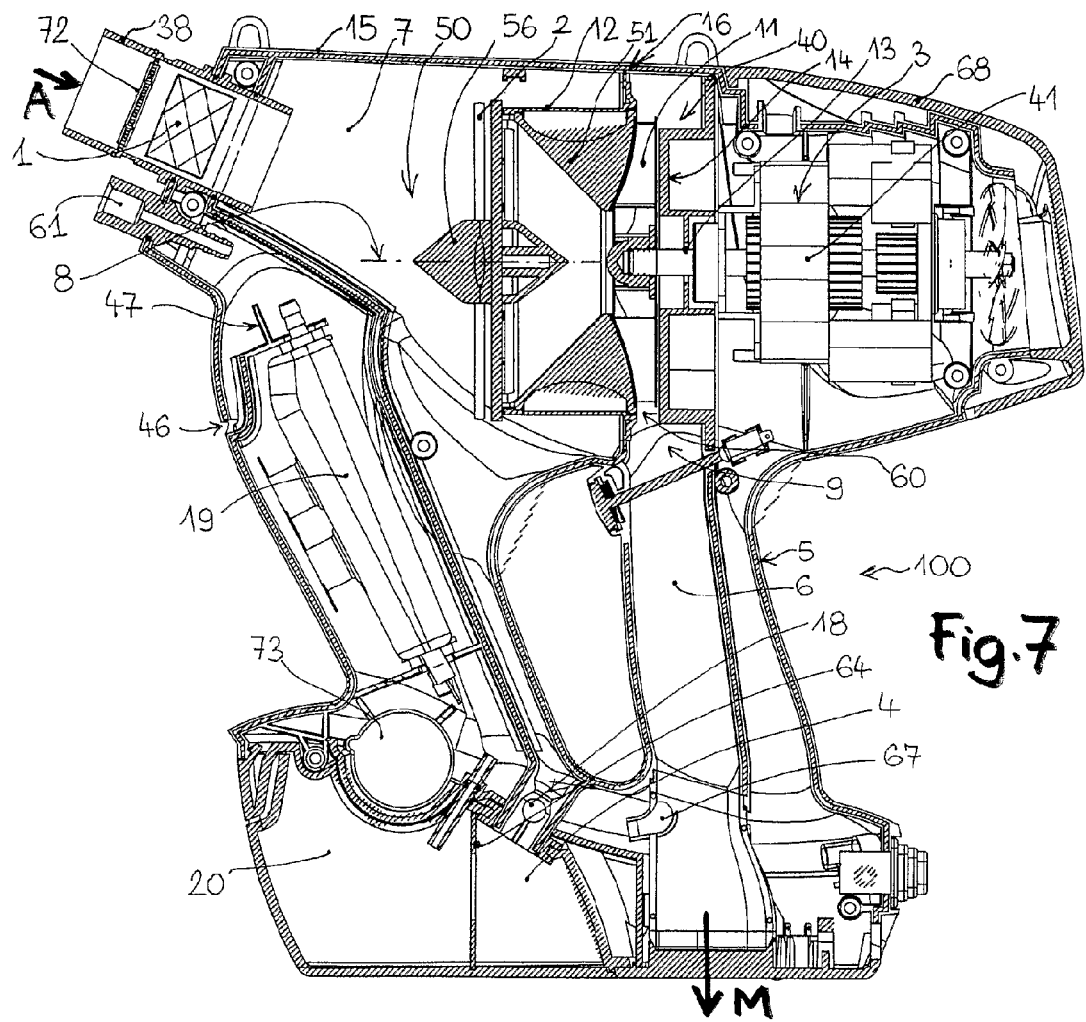
FIG. 7 shows a schematic and cross-sectional view of a vacuum suction and cleaning appliance for water and/or dust according to a third variant of the invention.

In a preferred embodiment, as can be seen in FIG. 1 or 7, the air-water separating means 50 includes at least one brush 2 driven in rotation, in the extension of the ventilation means 40. This brush 2 rotates with at least one turbine 11 or/and one conduit 51 serving as a support.

The appliance 1 according to the invention includes an evacuation channel or hose 6 for liquid-free air, preferably built-in in the handle 5. This channel or hose 6 prolongs a by-pass 60. This by-pass 60 consists of a deviation, provided for namely in the shell 15 of the appliance 100, designed capable of preventing the air from passing into the driving means 41 of the ventilation means 40. The by-pass 60 is preferably designed with sound insulation by an ad hoc coating.

The recovery tank for soiled liquid and/or dust 4 is preferably located under the separator 50.

In a preferred embodiment, the appliance 100 according to the invention is designed capable of generating vapor by heating the cleaning product, preferably water, under the action of the heating means 19. This vapor is diffused through a vapor outlet conduit 61, preferably located in the immediate vicinity of the nozzle 38.

In order to cope with the main problems not solved by the vacuum cleaners for dust, the appliance is advantageously provided with heating means with electrical and thermal insulation based on ceramic materials or/and oxidized metals, permitting to quickly generate vapor under optimal conditions of size, efficiency and safety, and is designed capable of receiving a scraping organ, namely a scraper specifically adapted for the cleaning of windows, placed at the front of said vacuum suction appliance.

This appliance according to the invention is a very efficient manual vapor cleaner onto which many accessories can be adapted, namely for recovering the wet residues and not only dry dust.

Preferably and more generally, the suction nozzle 38 is or includes a scraping organ, preferably in the form of a scraper especially adapted for the cleaning of windows. The scraper is then rigidly connected to the recovering appliance so that the integrated handle 5 allows its handling. A rigid hose provided with a nozzle, flexible or rigid, whether telescopic or not, intermediate extension elements, and other known accessories can also be connected to the inlet, designed by A.

Figure 2:
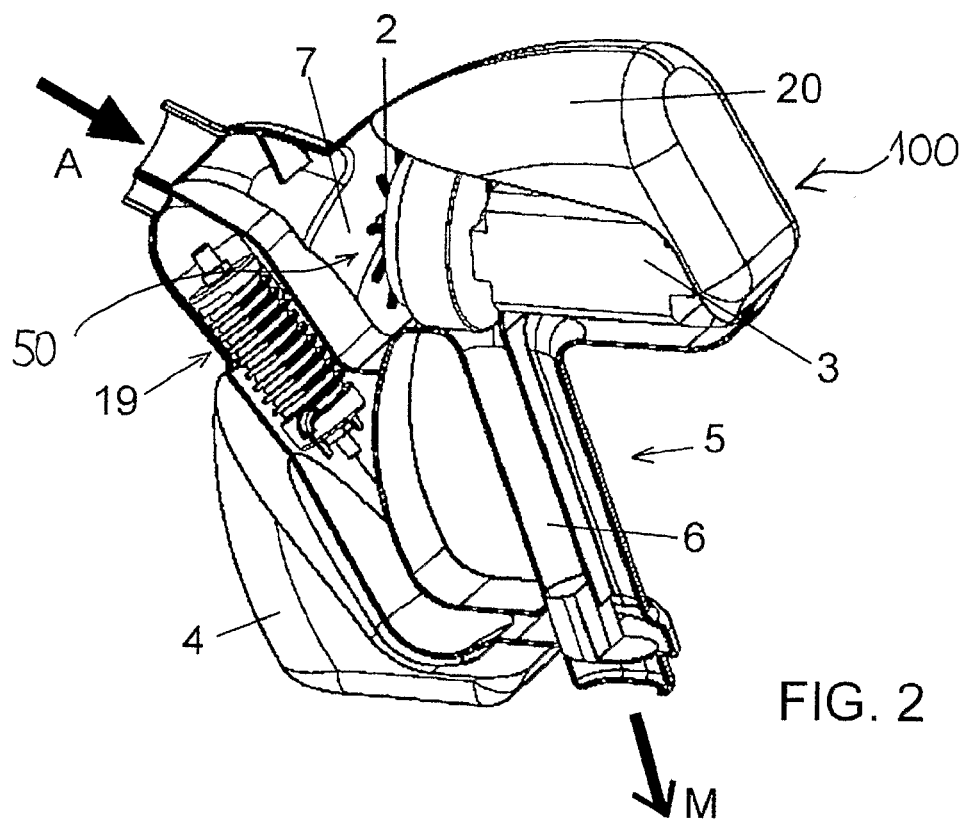
FIG. 2 is a schematic perspective and cut-away view of the first variant of embodiment of the invention.

According to a first variant of embodiment shown in FIGS. 1 and 2, the portable vacuum suction and cleaning appliance includes the following essential parts:
air-water separating means 50 preferably formed of at least one flat brush 2 driven in rotation, in the extension of the ventilation means 40, by motorization means 3, preferably a motor, or a turbine 11. It can also include a devesiculating filter 1. The turbine 11 can itself be taken along by another vacuum suction appliance in the extension at M ensuring the air flow;
a separate recovery tank for liquid 4 preferably located under said separator;
a handle 5 allowing handling the appliance and the nozzle;
an evacuation hose 6 in the extension of the by-pass, for liquid-free air and dust, incorporated in the handle 5, the gas flow being then evacuated in the direction of the arrow, at the outlet M.

These features are also visible in FIGS. 6 and 7 showing other embodiments.

Depending on the conditions of use, namely whether the appliance is provided and in particular adapted for a window-cleaning function, it can be contemplated to insert only one air-water separating means 50.

The air-water separating means 50 is preferably positioned in the center of the appliance, in particular when it is a water-air separator with a brush of the type described in the patent applications FR 0602951 and PCT/FR 2007/051060 of the applicant. It can also be placed in the receiving chamber 7 immediately at the inlet of the appliance, in order to facilitate the cleaning, in particular when it consists of a devesiculating filter 1 formed by a foam, a fibrous lattice, a granulate, or any other substrate.

The use of such an air-water separator with a brush allows achieving a very good separation efficiency, with very low pressure losses. This thus allows achieving, for the same power of the motorization means 3, here advantageously chosen common for the ventilation and separation functions, a better suction efficiency than in the prior art, through a better vacuum.

The peculiarity of this configuration consists in that the brush 2 rotates with its turbine 11 or nozzle 51 serving as a support, thus without friction. One or two preferably alternately superimposed brushes 2 ensure retaining the water drops by centrifugal projection against the walls, these drops sliding by gravity towards the recovery tank.

The driving of the turbine 11 or nozzle 51 by the motorization means 3 can occur in various ways, either by the solution of the preferred driving in line in the appliances of a sufficient external volume, or by arranging side-by-side the axis of the turbine 11 and that of motorization means 3 and by using means for transmitting the rotational motion, such as belts, or rubber rollers, or pinions, or the like. The latter arrangement is interesting in the case of manual small-volume appliances, such as a scraper for windows or a small vapor cleaner, designed to be held with one hand during their use, and which can have neither a large weight nor a large volume. The particular use of rubber rollers or bevel gears is necessary when the small overall dimensions oblige to have divergent axes of motorization means 3, on the one hand, and the turbine 11, on the other hand.

This arrangement contributes to a good balancing of the appliance. Indeed, a constant concern for the ergonomic aspect in the design permits to arrange the centre of gravity of the appliance at the level of a gripping handle, in order to avoid a painful overhang for the user in an extended handling. This optimal distribution of the masses also includes the balancing of the soiled-water tanks 4 and the clean-water tanks 20 with respect to this centre of gravity. It should be noted that, in a particular embodiment, these two tanks can form one chamber, ideally located under the centre of gravity, subdivided into at least two compartments separated by a filtering partition 64, for example in the form of a woven or cloth filter, a 3-micron opening providing good results for household use, for example for the cleaning of windows. The filtering partition 64 is swept by the movements of the operator, which contributes to a self-cleaning. In a variant of embodiment, a single tank is subdivided into a clean-liquid tank 20 and a soiled-liquid tank 4 by a membrane separating these two tanks 20 and 4 and fixed at the periphery, so as to be able to move between extreme positions, a starting position in which the total volume is occupied by the clean liquid, and an end position in which the total volume is occupied by soiled liquid.

Of course, the position and the shape of the handling handle 5 are designed for good comfort of use. In a preferred embodiment and to the same end, the outlet of air returning to the environment is directed to the bottom, in a normal position of use. In a variant, this air outlet can also be provided with a directional nozzle by the user.

Preferably, as can be seen in FIG. 6, the recovery tank for soiled liquid and/or dust 4 includes filtering means, preferably a folded filter 71, intermediate in the flow of a cyclonic inlet and upstream of the separator 50. Such a folded filter 71 can be chosen washable, or also disposable because of its low cost.

Thanks to this folded filter 71, most of the dry dust is retained, and collected towards the bottom of the tank 4, or towards a double bottom 74 of the latter. The air loaded with water, and thus with a smaller quantity of dust, exiting the folded filter 71 upstream of the brush 2, is driven towards the latter at the level of which occur the separation and the cleaning of the air for its rejection into the environment.

Of course, the motorization means of the ventilation-suction portion, on the one hand, and the air-water separation portion, on the other hand, can be disjoined, but such an arrangement is against the search for compactness, for low mass and cost, undertaken within the framework of the invention.

In the various variants, the recovery tank 4 is preferably arranged in the lower part of the appliance and advantageously provided with a drain plug or designed removable for its emptying and cleaning.

Figure 4:
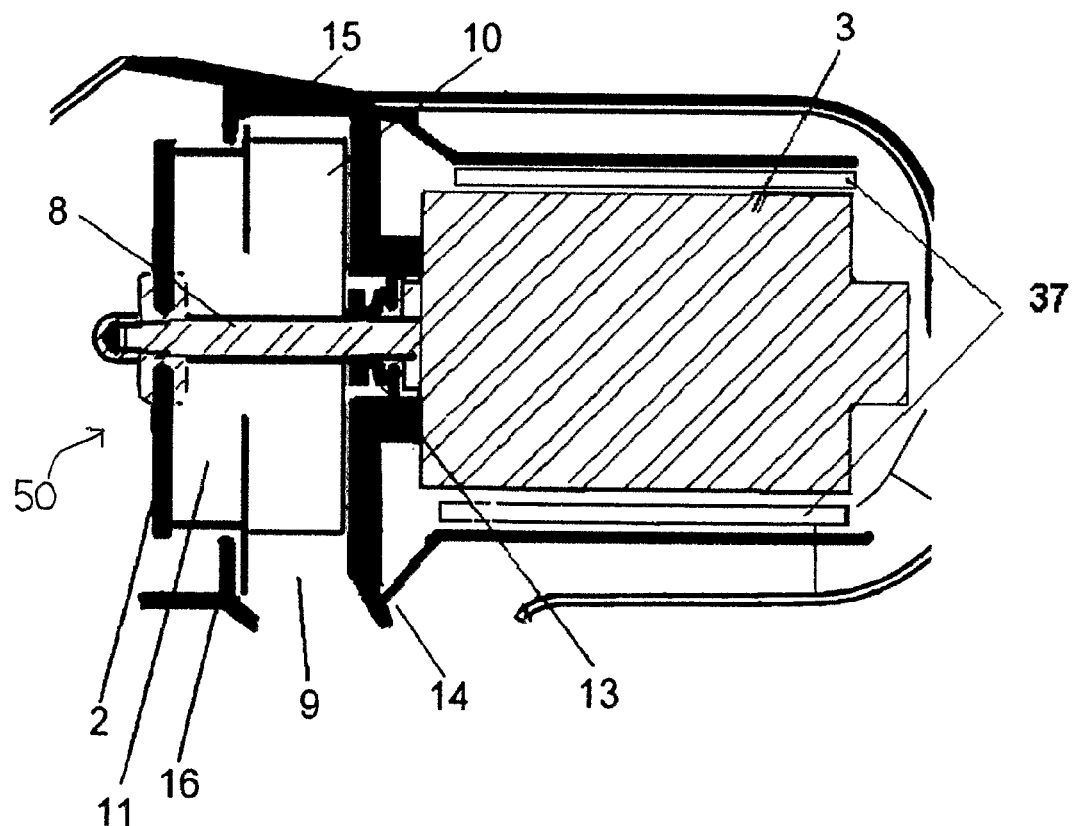
FIG. 4 is a schematic and cross-sectional view of the separating appliance with a brush of FIG. 3, with its motorization means.

As shown in FIGS. 1 and 2, a first variant of embodiment has an overall gun-shape, the recovery tank 4 being placed at the front and lower portion, and the ventilation-separator unit, as shown in FIG. 4, being placed in the rear body of the appliance. The intermediate portion, into which the air ends, is a receiving chamber 7.

In order to improve the incoming flow and the flowing of the water droplets, the receiving chamber 7 can include grooves along the fuselage and a valve 17 can be so oriented as to direct the air towards the center of the flat brush 2.

Figure 3:
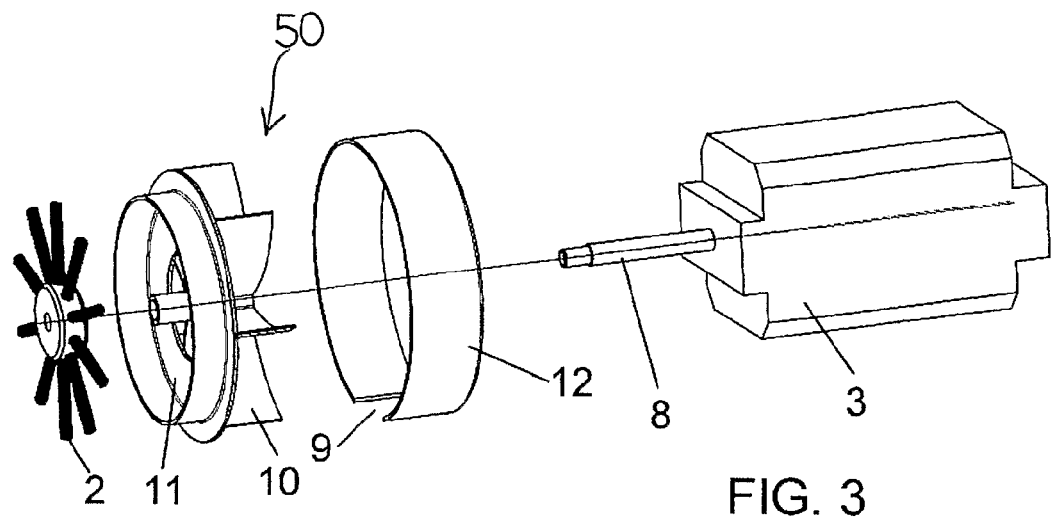
FIG. 3 shows a schematic exploded view of the air-water separating appliance with a brush in a first embodiment, as well as the ventilation means.

In the embodiment as visible in FIG. 3, the air separated from the water and dust by means of the separator 2 with a brush is evacuated through an opening 9 located at one point, tangential to the ventilation propeller 10, located in front and in the extension of the evacuation hose 6 to the outside. The opening 9 is provided for in a peripheral ring 12 integrated in the shell, or can directly be an integral part of the shell 15, depending on the design, in this case, the so formed evacuation hose and the by-pass form one and the same part comprised of two half shells directly formed by the outer shell 15. The determined unit is more economical and its assembling occurs directly. The air is then evacuated through the hose 6 towards the outlet M in the direction of the arrow. This type of by-pass 60 is applicable to any design of vacuum-cleaner, cleaner, shampooing cleaner, or ejector-extractor requiring an air flow separated from the electric motor because of its moisture content.

In a first variant of embodiment, the motor 3 drives in rotation the axis 8 bearing the flat brush 2 and a propeller or turbine 11. The flat brush 2 fixed to the axis 8 is positioned in front of a turbine 11 or a nozzle 51 in the extension of the latter, thus compensating for the lowering of the air flow-rate caused by said brush. The nozzle 51, or the unit of nozzle and turbine, is inserted into a peripheral cage 12 including an opening 9 for the evacuation of the air.

In order to ensure the tightness between the electric motor and the circulating air flow, a seal 13 for a rotating axis is positioned between a circular plate 14 and the motor 3.

In another variant, the brush 2 is not fixed by its axis of rotation, but is maintained peripherally by retaining means, retaining rings or the like, on a nozzle 51 or a turbine 11.

The electric motor 3 is ventilated by its own ventilation and various openings in the shell.

The unit shown in FIG. 3 is positioned in the shell 15 with the putting into place of silent-blocs 37, as indicated in FIG. 4, allowing limiting the vibrations and the acoustic resonance of the appliance 100, the by-pass unit being out of contact with the rest of the separator/motor/ventilation body. The mounting thus carried out is more economical and quiet.

The shell portion 15 of the separator, a second applied disc 16, or an edge integrated into the shell, and the circular plate 14 delimit the internal space 60 for the flowing out of liquid-free air. This internal space or by-pass 60 integrated into the shell has an economic advantage because of its integration, a simplification during the mounting, a reduction in volume and weight. This internal space can be covered with a coating or a sound-proof surface treatment.

In a particularly compact and economical version, as can be seen in FIGS. 7 and 8, corresponding to the preferred embodiment of the invention, are coaxially mounted and in this order, in the direction of the flow from A to M:

at least one brush 2, mounted resting against a supporting edge. The latter is provided for on a flange including an opening for the passing through of the flow from the brush 2, or on a nozzle 51. The brush 2 is driven by this nozzle 51, or a turbine 11, and ensures the separation of the gas phase and the liquid phase, which contains the dust;

such a flange, fixed on said nozzle 51, namely by a clamping ring;

a nozzle 51, mounted movable in rotation in a chamber formed by a peripheral ring 12 fixed to the shell 15. This ring 12 is preferably designed so as to form a receptacle 55 capable of collecting the water resulting from the separation, when the appliance is handled in various positions, namely the nozzle 38 being oriented upwards. This nozzle 51 is fixed to a turbine 11 at its end opposite the brush 2, namely by gluing or by snapping-on, for example by means of a counter-locking ring. The nozzle 51 has an evolutive internal shape, becoming narrower, in order to compensate for the reduction of the air-inlet cross-section due to the brush with respect to the air-inlet cross-section of the turbine, from a substantially cylindrical outer shape in the vicinity of the brush 2 to a substantially truncated shape ending at an inlet opening in turbine 11. This nozzle 51 includes, outside its downstream portion in the direction of the flow developing towards its face of contact with the turbine 11, stiffening supports 52. The latter are designed capable of forming blades for creating a particular turbulent air flow in an external annular channel 53 formed between the nozzle 51 and the peripheral ring 12, which air flow is designed capable of preventing the rising of a parasitic flow at the level of an annular space 54 due to a functional backlash. These supports 52 can thus be inclined, in order to put this channel 53 under pressure. The nozzle 51 guides the flow axially towards the turbine 11;

a turbine 11, namely made of metal or plastic, including blades, driven by motorization means 3 and arranged in a chamber provided for in the shell 15 of the appliance, in front of a deflector or circular plate 14 mounted integral with the shell 15 and allowing the release of the air from the turbine 11 and its side evacuation through the by-pass 60.

The peripheral ring 12 is preferably tangential to a brush 2, one of its ends, which may be into contact with the brush 2, advantageously including one or more concentric grooves capable of containing a water seal.

In a particular embodiment, in the vicinity of the axis of the nozzle 51 and the brush 2 are mounted, on both sides of the letter, conical or ogival deviators 56 designed capable of preventing side turbulences and parasitic vacuums.

It is understood that the separator 50 is self-cleaning during the rotation of the brush 2, any dirt being evacuated under the action of the centrifugal force.

Though, in a preferred embodiment, the turbine 11 and the nozzle 51 are coupled, namely in a preferred variant with a nozzle 51 glued or snapped onto the turbine 11, or in one piece with the latter, it is possible, in a variant of embodiment, to uncouple them.

The handle 5 shown in FIGS. 1 and 2 and 7 includes a side or central air-evacuation hose 6 applied against or integrated into the handle and ducts for the passing-through of electricity and eventually water, in the case of an appliance with integrated heating enabling it to produce vapor.

In the handle 5 can be added a traditional sound-absorbent system with sound trap, or a surface treatment as in the internal air-flow space described above. The air outlet of this handle 5 can receive a perfume diffuser, a complementary silencer, hoses for a blower, or various other accessories.

Depending on the various possible positionings of the receiving tank 4, a non-return system 18, with a ball or in the form of a non-return valve, as shown in FIG. 1 or 7, a nozzle or a non-return valve can be added, in order to avoid any return of the recovered liquid to the reception chamber 7. This enables the use of the appliance in all positions.

The appliance 100 is advantageously provided with heating means 19 designed capable of generating vapor or/and heating a liquid, shown in FIG. 5. It then includes a liquid tank 20, namely a water tank, for supplying this heating means 19.

This water tank 20 can, as can be seen in FIG. 7, be located in the lower portion under the centre of gravity of the appliance 100, which then includes a pump 73. In another embodiment, it is located above the heating means 19, so as to ensure the supply by gravity when the appliance 100 is in the usual operation position.

As can be seen in FIG. 5, the tubular heating means 19 preferably includes, from the inside to the outside:

a central tube 21 made of metal, eventually of stainless, depending on the electrical insulator used, in which circulates water to be vaporized, either directly or through a device designed capable of maximizing its path and thus the contact surface, such as a coil, a helical partition 42, or the like, applied against the wall of the tube 21. Such a helical guiding avoids a too direct exit of the vapor flow.

Alloys with high dilation index such as aluminum alloys are preferably avoided;

an electrical insulator, which is chosen to also be the best possible heat conductor 22 or 25, is designed capable of allowing eliminating the grounding in this type of heating body. Such an insulator can also be applied inside the tube 21;

a heating resistance 23, namely formed, economically, of an electric bulb, placed at the periphery of the insulator covering the tube 21 and connected to an electric circuit by means of two plugs. The thickness of the bulb can be supplemented by a heat-conducting ceramic, in order to improve the inertia of the unit if necessary. Preferably, this resistance 23 is not sheathed, with a view to an as small as possible volume. The heating resistance 23 can have various configurations, for example wound into windings at the periphery of the heat-conducting electrical insulator, or in a to-and-fro shape at the periphery of the tube 21. If the resistance 23 is covered with an electrical insulator, the windings can be jointed. The tube 21 can include at least one groove, namely a helical groove, for accommodating the windings. For the same value of electrical resistance, the resistance 23 in windings, for the same length of the tube 21, can, compared to a straight resistance, have a quite larger cross-section, it can also be better applied against the tube, which provides increased reliability;

an external thermal insulator 24, which is advantageously also an electrical insulator, protecting the whole heating means 19. The material used is based on non-fibrous ceramic with a high heat-insulation coefficient, because the fibrous materials are often and more and more classified as hazardous and become prohibited.

In this unit, the grounding wire is eliminated, which enables making the electrical supply cord lighter. In addition to the large reduction in weight and cost, the reduction in volume resulting from a two-wire design instead of a three-wire design enables to provide the appliance according to the invention with cord reel, in order to meet the expectations of the market.

The heat-conducting electrical insulator 22 or 25 is preferably in the form of a solid material, which can be for example a ceramic 22, or a porcelain suited for food or the like, or in the form of a thin layer 25 deposited on the surface of the central tube 21, for example a layer of aluminum oxide obtained by plasma projection. This deposition can also be obtained by low-temperature ceramitation (500° C.) after quenching, in a mixture of aluminum oxide and silicon dioxide, among others, this economical solution also allows achieving a perfect protection against oxidation of the metal tube 21, which can therefore be made of non-stainless material, and in addition with a double electrical insulation. This technique close to enameling, which can also be used, enables preventing the adhesion of limestone, which causes a disorder of the electrical safeties and outputs. It is also possible to cover the tube 21 with a deposition based on aluminum oxide and resin. These materials are non-restrictive, other types of applications and products remain possible as soon as materials having the electrical-insulation and heat-conductivity or thermal and electrical insulation property should be used outdoors.

A layer of insulator 22 or 25, such as alumina or magnesia, with a thickness of about 0.10 mm provides good results in the particular application of a manual window-cleaner operating with vapor. Preferably, the insulator 25, applied on the tube 21, is a better thermal conductor than the insulator 22, which is used for the protection of the heating resistance 24. This difference in thermal conduction advantageously results from a definitely higher alumina rate in the insulator 25 than in the insulator 22.

The thickness of the tube 21 is calculated depending on the desired vapor flow rate, on the electrical power of the resistance, and on the inertia necessary for a permanent flow rate.

Other non-restrictive materials, such magnesia, dense alumina, boron nitride, silicon, can be used depending on the needs and the non-restrictive means of application.

The heat-conducting electrical insulator in the form of a thin layer 25 has the advantage of reducing the size of the heating means 19 and allows faster heat diffusion at the central tube 21 in contact with the water. This application in the form of a thin layer can be carried out by plasma projection or resin varnishing, or by quenching in a bath, or enameling, or any other known system.

The heating unit is advantageously supplemented with two fittings 26 and 27, larger at the outlet in order to avoid the pressure, allowing the encasement of the conductive pipes.

The heating means 19, thanks to its simplicity, is more economical and lighter than the usual armored resistances embedded in aluminum blocks. Furthermore, the advantage of using a ceramic is that the grounding of this unit is avoided, because water and its conduit are at no time in contact with the electric circuit. A probe or pellet thermostat with a bimetallic platelet allows the thermal and electrical regulation of the heating means 19.

The ejection of vapor is controlled by a trigger or an electric control accessible to the hand of the user who carries the recovery appliance. The control for sending the water to the resistance occurs by a pressure trigger compressing the pipe, or by an electric control controlling a pump 73. A non-return ball valve can guarantee a single direction of circulation during the production of vapor.

The vapor produced by the heating means is ejected towards its outlet conduit 61, in the direction of the surface to be treated, by known conduits and means.

The heating means 19 is preferably positioned at the front and lower portion of the appliance, so that the hand of the user on the handle 5 is not near the heater, though it is thermally insulated. The separation between the electric motor and this heating body is also an advantage from the thermal point of view, since the motor is thus not situated in a preheated air flow.

Preferably, for a good ventilation of the heating means 19, and the cooling of the shell 15 in its vicinity, part of the air coming from the turbine is used, which is expelled into the pipe 6 of the handle 5: an obstacle, in the form of a deviation 67, is interposed in order to convey part of the air through the outlet at M, and to deviate part of the air to a circulation zone around the heating means 19, before exiting through an opening 46 ending outside, preferably at the front portion of the appliance, towards the nozzle 38, so as not to hinder the user. A water trap, for example in the form of a baffle 47 can preferably also be interposed on the circulation of this derived air flow, before its exiting through the opening 46. This deviation for cooling the heating means 19 can also be designed to be supplied with cooling air from the motorization means 3, the shell 15 then includes channels capable of ensuring the conveying of this air.

The interest of ventilating the heating portion is to minimize the temperature in the receptacle of the heating portion, and to thus be able to use, for the shell 15, materials that are cheaper than the heat-resisting materials impossible to circumvent for high temperatures, and namely to use "ABS", or another plastic or composite material of average heat-resisting quality, i.e. capable of withstanding, without deformation, a temperature of 100° C., and of a considerably lower cost.

As can be seen in FIG. 12, the appliance 100 preferably includes, at least locally around the motorization means 3, a double shell comprised of the main shell 15, on the one hand, and the tank 20 or a hood 68, on the other hand, the tank 20 or the hood 68 being designed capable of covering the shell 15 at a short distance from the latter, while providing a space 76 for the input of fresh air, and forming a baffle and water traps at the level of its junctions with the shell 15. This double shell thus ensures a good ventilation of the motorization means 3. Preferably, around the latter, a hood 68 covers the shell at a short distance from the latter, while proving a space for the input of fresh air, taken under this hood 68 in the vicinity of the handle 5, and moving to the top of the appliance towards a masked air inlet. Through the baffle formed by this hood 68 and the water traps at the level of joining rings between the hood 68 and the shell 15, any circulation of water or moisture towards the motorization means 3 is prevented. The air having been used for cooling is, in turn, ejected laterally at the level of an opening 77, in order not to hinder the user.

The design of such heating means 19 enables avoiding the traditional solution of a bulky and heavy boiler. For the same volume, the invention enables doubling the power compared to a usual armored resistance, and improving the reliability.

Such heating means 19, here shown in a preferred tubular form, can of course adopt various forms. Its particularly well suited use for a cleaning appliance according to the invention can also find other applications, as a matter of fact for the appliances provided with boilers, such as vacuum cleaner, cleaner, shampooing cleaner, or ejector-extractor, boilers the efficiency and the quick heating of which can thus be considerably improved.

A portable small-size appliance according to the invention, i.e. having a mass of 2 kg or less, preferably a mass close to 1.5 kg, and a volume lower than 300 mm×300 mm×150 mm, easily reaches, with such heating means, a heating power, at the level of the heating means 19, of 1500 to 2000 W. Such an appliance is designed with ventilation means 40 capable of creating a suction vacuum of 15 kPa at least between the inlet A and the outlet M.

The portable vacuum suction and cleaning appliance can also include non-return valves on the various tanks and various other useful accessories.

Different configurations, different shapes and dimensions can be contemplated for the water tank 20 and the recovery tank 4, for the heating means 19 and the orientation of the incorporated air-water separator, without departing from the framework of the invention. It is namely possible to install the two tanks 4 and 20 in the side portions, on both sides of the handle 5.

Figure 13:
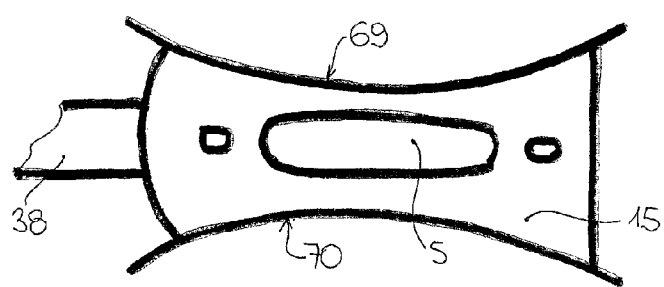
FIG. 13 shows a schematic and top view of a detail of a vacuum suction and cleaning appliance for water and/or dust according to the invention.

In a particular version, as can be seen in FIG. 13, the sides 69, 70 of the appliance 100, on both sides of the handle 5, are concave, in order to be able to be fixed on a hip of the user, for example, irrespective of the latter being right-handed or left-handed, namely when the appliance is carried in a shoulder-belt. These concave sides can also be formed of side flanges in the form of plates applied against the shell 15. They can also be designed overhanging, in order to use them as a harness for re-coiling the power cord of the appliance, or hoses, or the like.

FIG. 14 shows a generally vacuum-cleaner that can be carried in a shoulder-belt according to a more complete variant, the suction inlet A of which is no longer placed in front of the receiving chamber 7, but under the recovery tank 4 and directly in the latter, it is thus possible to suck up and filter dry dust directly with water. The developed concept is a genuine vacuum-cleaner for water and dry dust. The inlet A is provided with a hose with accessories. This filtration with water can also be reinforced with an air-water mixer forming a safety valve of the type described in the patent application FR 0604955 of the applicant.

The portable vacuum suction and cleaning appliance can in addition include a nozzle 38 provided with a scraping organ useful for cleaning windows. Such a scraping organ is shown in FIGS. 9 to 11.

The scraping organ is shown in cross-section in FIG. 10 and includes three components:
a scraping portion 29,
a support 30 for the scraping portion,
a scraper shell 31.

The scraping portion 29 preferably includes an anti-drip device formed by a set of grooves 34 oriented in the direction of the suction flow, i.e. in a direction perpendicular to the scraping front 33 of the scraper.

The scraping portion 29 is preferably made of flexible plastic and includes, as shown in FIG. 9, a V-shaped scraping front 33 and grooves 34 that can be in the form of half cylinders or also V-shaped. Under the action of the capillarity of the liquids, gravity and the suction, these grooves guide water to the suction source during scraping. This anti-drip device is particularly effective in the application of a window-scraper.

A bead 35 inserted into a groove 36 enables maintaining the scraping portion 29 in its support 30. The support 30 including the groove 36 is shown in FIG. 11.

The suction inlet behind the scraping portion 29 has a conical shape towards the center, in order to allow a regular suction over the full length. The space 32 between the scraping portion 29 and the suction inlet is reduced as much as possible, in order to increase the vacuum and thus the suction power.

As can be seen in FIG. 10, in a preferred embodiment, a partition 64 separates a channel 65 for supplying vapor to the scraping portion 29 and a suction channel 66 towards the nozzle 38. Advantageously, a water-droplet trap 62 is provided at the end of the channel 65, in order to avoid any return, at the level of the vapor-outlet area 63. In this respect, the appliance 100 preferably includes a device that automatically triggers the suction when the generation of vapor ceases, in order to avoid water drops from falling on the floor in the working area.

What is claimed is:

1. Vacuum suction and cleaning appliance for water and/or dust including, integrated into a shell:
a first nozzle,
ventilation means,
a clean-water tank,
an air-water separator,
a recovery tank for soiled liquid and/or dust located under said air-water separator,
a handle designed capable of allowing handling the appliance with one hand,
heating means using ceramic for electrical and thermal insulation, designed capable of generating vapor, and
a hose for evacuating the liquid-free air, incorporated in said handle and prolonging a by-pass,
wherein the vacuum suction and cleaning appliance comprises, coaxially mounted and in this order, in the direction of the flow from said first nozzle to the evacuation hose:
at least one brush mounted movable in rotation in a first chamber formed by a peripheral ring fixed to the shell, in the extension of said ventilation means, wherein said at least one brush is part of said air-water separator,
a second nozzle, mounted movable in rotation in the first chamber formed by the peripheral ring fixed to the shell, and
a turbine including blades, driven by motorization means and arranged in a second chamber provided in the shell of the appliance, in front of a deflector or circular plate mounted integral with the shell and allowing tangential release of air from the turbine and side evacuation of the air through the by-pass,
wherein the second nozzle drives the air flow axially towards the turbine, and the at least one brush is mounted resting (i) against a supporting edge provided on a flange including an opening for the passing through of air, or (ii) on the second nozzle, and is driven in rotation by the second nozzle or by the turbine.

2. Vacuum suction and cleaning appliance according to claim 1, wherein said second nozzle comprises stiffening supports creating, in an external annular channel formed between the second nozzle and the peripheral ring, a turbulent air flow capable of preventing the rising of a parasitic flow.

3. Vacuum suction and cleaning appliance according to claim 1, wherein the peripheral ring is tangential to the at least one brush, and one of ends of the peripheral ring, designed capable of being into contact with the brush, includes at least one concentric groove capable of containing a water seal.

4. Vacuum suction and cleaning appliance according to claim 1, wherein said recovery tank includes filtering means, or a folded filter, designed washable or disposable, in the flow of a cyclonic inlet upstream of said separator.

5. Vacuum suction and cleaning appliance according to claim 1, wherein the appliance includes one single tank subdivided into a clean-liquid tank and a soiled-liquid tank by a membrane separating these two tanks and fixed at a periphery of said membrane, so as to be able to move between extreme positions, including (i) a starting position in which a total volume of the recovery tank is occupied by clean liquid, and (ii) an end position in which the total volume is occupied by soiled liquid.

6. Vacuum suction and cleaning appliance according to claim 1, wherein the appliance includes one single tank subdivided into a clean-liquid tank and a soiled-liquid tank by a filtering partition separating these two tanks.

7. Vacuum suction and cleaning appliance according to claim 1, wherein the appliance includes a non-return system in the return channel for soiled liquid from a receiving chamber containing said separator to the soiled-liquid tank.

8. Vacuum suction and cleaning appliance according to claim 1, wherein the heating means is tubular and includes, from the inside to the outside:
a central tube in which circulates the liquid to be vaporized,
an electrical insulator and heat conductor,
a heating resistance placed at the periphery of the heating means,
an external thermal insulator of non-fibrous ceramic and electric insulator, protecting the complete heating means.

9. Vacuum suction and cleaning appliance according to claim 1, wherein the tubular heating means includes inside said tube an internal conduit in the form of a worm increasing the surface of contact of the liquid with a wall of said tube.

10. Vacuum suction and cleaning appliance according to claim 9, wherein the thermal conducting electrical insulator is in the form of a solid material formed by a ceramic, or by a thin layer deposited on the surface of the central tube in the form of a layer of aluminum oxide or of a thin layer of ceramic obtained by quenching and baking lining the electric insulation from water and limiting the adhesion of limestone.

11. Vacuum suction and cleaning appliance according to claim 1, wherein the nozzle is provided with a scraping organ designed capable of cleaning windows, which includes a scraping portion that is flexible and includes a V-shaped scraping front and grooves that can be in the shape of a half cylinder or V-shaped, and the set of grooves oriented in the direction of the suction flow perpendicular to the scraping front of the scraper forming an anti-drip device.

12. Vacuum suction and cleaning appliance according to claim 1, wherein a partition separates a channel for supplying vapor to the scraping portion, and a suction channel towards the nozzle, and a water-droplet trap is provided at the end of the channel, in order to avoid any return, at the level of the vapor outlet.

13. Vapor window scraper formed by a vacuum suction and cleaning appliance according to claim 1, and including a scraping organ designed capable of cleaning windows, which includes a scraping portion that is flexible and includes a V-shaped scraping front and grooves that can be in the shape of a half cylinder or V-shaped, and the set of grooves oriented in the direction of the suction flow perpendicular to the scraping front of the scraper forming an anti-drip device.

14. Vacuum suction and cleaning appliance for water and/or dust including, integrated into a shell:
- a first nozzle,
- ventilation means,
- a clean-water tank,
- an air-water separator,
- a recovery tank for soiled liquid and/or dust located under said air-water separator,
- a handle designed capable of allowing handling the appliance with one hand,
- heating means using the ceramic for electrical and thermal insulation, designed capable of generating vapor,
- at least one brush driven in rotation, in the extension of said ventilation means, said at least one brush rotating with at least one of (i) a turbine and (ii)a second nozzle, serving as a support, wherein said at least one brush is part of said air-water separator,
- a hose for evacuating the liquid-free air, incorporated in said handle and prolonging a by-pass,
- wherein said recovery tank for soiled liquid and/or dust is the one single tank of said appliance and is subdivided into a clean-liquid tank and a soiled-liquid tank by a membrane separating these two tanks and fixed at a periphery of said membrane, so as to be able to move between extreme positions including (i) a starting position in which a total volume of the recovery tank is occupied by clean liquid, and (ii) an end position in which the total volume is occupied by soiled liquid.

15. Vacuum suction and cleaning appliance according to claim 14, comprising, coaxially mounted and in this order, in the direction of the flow from said first nozzle to the evacuation hose:
- the at least one brush, mounted resting against a supporting edge provided (i) on a flange including an opening for passing through of air or (ii) on the second nozzle, and designed capable of being driven by the second nozzle or by the turbine;
- the second nozzle, mounted movable in rotation in a first chamber formed by a peripheral ring fixed to the shell, guiding the air flow axially towards the turbine; and
- the turbine including blades, driven by motorization means and arranged in a second chamber provided in the shell, in front of a deflector or circular plate mounted integral with the shell and allowing tangential release of air from the turbine and side evacuation of the air through the by-pass.

16. Vacuum suction and cleaning appliance according to claim 15, wherein said second nozzle comprises stiffening supports creating, in an external annular channel formed between the second nozzle and the peripheral ring, a turbulent air flow capable of preventing the rising of a parasitic flow.

* * * * *

UNITED STATES PATENT AND TRADEMARK OFFICE
CERTIFICATE OF CORRECTION

PATENT NO. : 8,407,850 B2  
APPLICATION NO. : 12/517147  
DATED : April 2, 2013  
INVENTOR(S) : Gerard Curien Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this
First Day of September, 2015

Michelle K. Lee
*Director of the United States Patent and Trademark Office*